US009834711B2

(12) United States Patent
Araki

(10) Patent No.: US 9,834,711 B2
(45) Date of Patent: Dec. 5, 2017

(54) ONE-PACK MOISTURE-CURING COMPOSITION

(71) Applicant: The Yokohama Rubber Co., LTD., Minato-ku, Tokyo (JP)

(72) Inventor: Kiminori Araki, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/769,375

(22) PCT Filed: Mar. 4, 2014

(86) PCT No.: PCT/JP2014/055518
§ 371 (c)(1),
(2) Date: Aug. 20, 2015

(87) PCT Pub. No.: WO2014/136800
PCT Pub. Date: Sep. 12, 2014

(65) Prior Publication Data
US 2016/0002511 A1    Jan. 7, 2016

(30) Foreign Application Priority Data
Mar. 7, 2013  (JP) .................................. 2013-045652

(51) Int. Cl.
*C08G 18/18* (2006.01)
*C08G 18/24* (2006.01)
(Continued)

(52) U.S. Cl.
CPC .......... *C09J 175/04* (2013.01); *C08G 18/163* (2013.01); *C08G 18/165* (2013.01); *C08G 18/1833* (2013.01); *C08G 18/2081* (2013.01); *C08G 18/227* (2013.01); *C08G 18/242* (2013.01); *C08G 18/307* (2013.01); *C08G 18/4825* (2013.01); *C08G 18/4829* (2013.01);
(Continued)

(58) Field of Classification Search
CPC ................ C08G 18/163; C08G 18/165; C08G 18/1833; C08G 18/2081; C08G 18/227; C08G 18/242; C08G 18/307; C08G 18/7831; C08G 18/792; C08G 18/8025; C08K 3/04; C09J 175/04
See application file for complete search history.

(56) References Cited

U.S. PATENT DOCUMENTS 6,362,300 B1 * 3/2002 Araki ................... C08G 18/12
                                                       524/115
6,657,035 B1    12/2003 Nakata et al.

FOREIGN PATENT DOCUMENTS

JP  2005-239753  9/2005
JP  2006-131802  5/2006
(Continued)

OTHER PUBLICATIONS

International Search Report for International Application No. PCT/JP2014/055518 dated Jun. 17, 2014, 2 pages, Japan.

*Primary Examiner* — Michael L Leonard
(74) *Attorney, Agent, or Firm* — Thorpe North & Western

(57) ABSTRACT

A one-pack moisture-curing composition of the present technology contains a preliminary composition, an adhesiveness-imparting agent containing a compound (A) and/or a compound (B), a first catalyst containing a compound (C) and/or dibutyltin bis(pentadione), and a second catalyst containing a dimorpholinodiethylether.

16 Claims, 1 Drawing Sheet

(51) Int. Cl.

| | |
|---|---|
| *C09J 175/04* | (2006.01) |
| *C08K 3/04* | (2006.01) |
| *C08G 18/78* | (2006.01) |
| *C08G 18/80* | (2006.01) |
| *C08G 18/16* | (2006.01) |
| *C08G 18/20* | (2006.01) |
| *C08G 18/22* | (2006.01) |
| *C08G 18/30* | (2006.01) |
| C08K 3/26 | (2006.01) |
| C08K 5/11 | (2006.01) |
| C08G 18/79 | (2006.01) |
| C08G 18/48 | (2006.01) |
| C08G 18/76 | (2006.01) |

(52) U.S. Cl.
CPC ....... *C08G 18/7831* (2013.01); *C08G 18/792* (2013.01); *C08G 18/8025* (2013.01); *C08K 3/04* (2013.01); C08G 18/4812 (2013.01); C08G 18/7671 (2013.01); C08G 18/791 (2013.01); C08K 3/26 (2013.01); C08K 5/11 (2013.01)

(56) References Cited

FOREIGN PATENT DOCUMENTS

| | | | |
|---|---|---|---|
| JP | 2006131802 A | * | 5/2006 |
| JP | 2006-233218 A | | 9/2006 |
| JP | 2012207122 A | * | 10/2012 |
| WO | WO 01/53423 | | 7/2001 |

* cited by examiner

ONE-PACK MOISTURE-CURING COMPOSITION

TECHNICAL FIELD

The present technology relates to a one-pack moisture-curing composition.

BACKGROUND

Urethane resin compositions utilizing moisture curing are widely used in various fields such as the vehicle field and the architecture field. In order to adhere a vehicle body and a window glass in the production of a vehicle, a primer composition is typically applied to the adhesion surface, and an adhesive is then applied thereon to attach the window glass to the vehicle body.

In primer compositions, considerable amounts of solvents are used to enable uniform coating, so from the perspective of the effects on workers or the effects on the environment, there have been proposed one-pack moisture-curing urethane compositions which make it possible to directly adhere a coated adherend (vehicle body) and a glass adherend without using a primer composition (for example, see Japanese Unexamined Patent Application Publication Nos. 2006-233218A and 2006-131802A).

Japanese Unexamined Patent Application Publication Nos. 2006-233218A describes a one-pack moisture-curing urethane composition which contains an isocyanate group terminated urethane prepolymer as a main component and can be adhered to a coated steel plate without using a primer by adding an appropriate amount of an aliphatic hydrocarbon compound such as polybutene or polyisobutene, which is a compound having a solubility parameter value from 6.0 to 9.0.

In addition, in Japanese Unexamined Patent Application Publication Nos. 2006-131802A describes a one-pack moisture-curing urethane composition which enables adhesion to a poorly adhesive coated steel plate without using a primer by establishing a specific relationship between the contents of a preliminary composition containing a urethane prepolymer, a filler, and a plasticizer, a specific adhesiveness-imparting agent, dimorpholinodiethylether, N,N-dimethylamino ethylmorpholine, 2-methyl-1,4-diazabicyclo[2,2,2]octane, and an organotin compound.

In particular, adhesive compositions for vehicles are required to be able to adhere a glass adherend to a poorly adhesive adherend such as a coated adherend without performing surface treatment by applying a primer, and also needs to be able to satisfy characteristics such as high-temperature/high-humidity adhesiveness, curing rate, flow resistance, storage stability, heat-resistant adhesiveness, and breaking elongation.

However, the one-pack moisture-curing urethane compositions described in Japanese Unexamined Patent Application Publication Nos. 2006-233218A and 2006-131802A have room for improvement in order to adhere a glass adherend to a poorly adhesive adherend such as a coated adherend without performing surface treatment and to be able to satisfy characteristics such as flow resistance, heat-resistant adhesiveness, and breaking elongation.

SUMMARY

The present technology provides a one-pack moisture-curing composition that exhibits excellent adhesiveness without performing surface treatment on the coated adherend and is able to satisfy characteristics such as flow resistance, heat-resistant adhesiveness, and breaking elongation.

The present technology is described in the following (1) to (4).

(1) A one-pack moisture-curing composition comprising:
a preliminary composition containing a urethane prepolymer having isocyanate groups at the terminals and carbon black;
an adhesiveness-imparting agent containing a compound (A) obtained by reacting diisocyanate and trimethylolpropane or glycerin so that the equivalent ratio of isocyanate groups to hydroxyl groups is from 1.8 to 2.2 and/or a compound (B), which is a biuret form or isocyanurate form of diisocyanate;
a first catalyst containing a compound (C) obtained by reacting 1,3-diacetoxy-1,1,3,3-tetrabutyldistannoxane and ethyl silicate at a molar ratio within a range of from 1:0.8 to 1:1.2 and/or dibutyltin bis(pentadione); and
a second catalyst containing dimorpholinodiethylether;
wherein when the content of the compound (A) is A parts by mass, the content of the compound (B) is B parts by mass, the content of the compound (C) is C parts by mass, the content of dibutyltin bis(pentadione) is D parts by mass, and the content of dimorpholinodiethylether is E parts by mass, the following Formulas (1) to (3) are satisfied with respect to 100 parts by mass of the preliminary composition.

$$0.1 \leq (A+B) \leq 5 \tag{1}$$

$$0.001 \leq (C+D) \leq 0.5 \tag{2}$$

$$0.01 \leq E \leq 2 \tag{3}$$

(2) The one-pack moisture-curing composition according to (1) above, wherein the second catalyst further contains N,N-dimethylamino ethylmorpholine; and
when the content of N,N-dimethylamino ethylmorpholine is F parts by mass, the following Formula (4) is satisfied with respect to 100 parts by mass of the preliminary composition.

$$F \leq 2 \tag{4}$$

(3) The one-pack moisture-curing composition according to (1) or (2) above wherein the following Formulas (5) and (6) are satisfied with respect to 100 parts by mass of the preliminary composition.

$$F \leq E \tag{5}$$

$$0.1 \leq (E+F) \leq 2 \tag{6}$$

(4) The one-pack moisture-curing composition according to any one of (1) to (3) above, wherein the diisocyanate is hexamethylene diisocyanate.

With the present technology, it is possible to exhibit excellent adhesiveness without performing surface treatment on the coated adherend and to satisfy characteristics such as flow resistance, heat-resistant adhesiveness, and breaking elongation.

DETAILED DESCRIPTION

Figure 1:
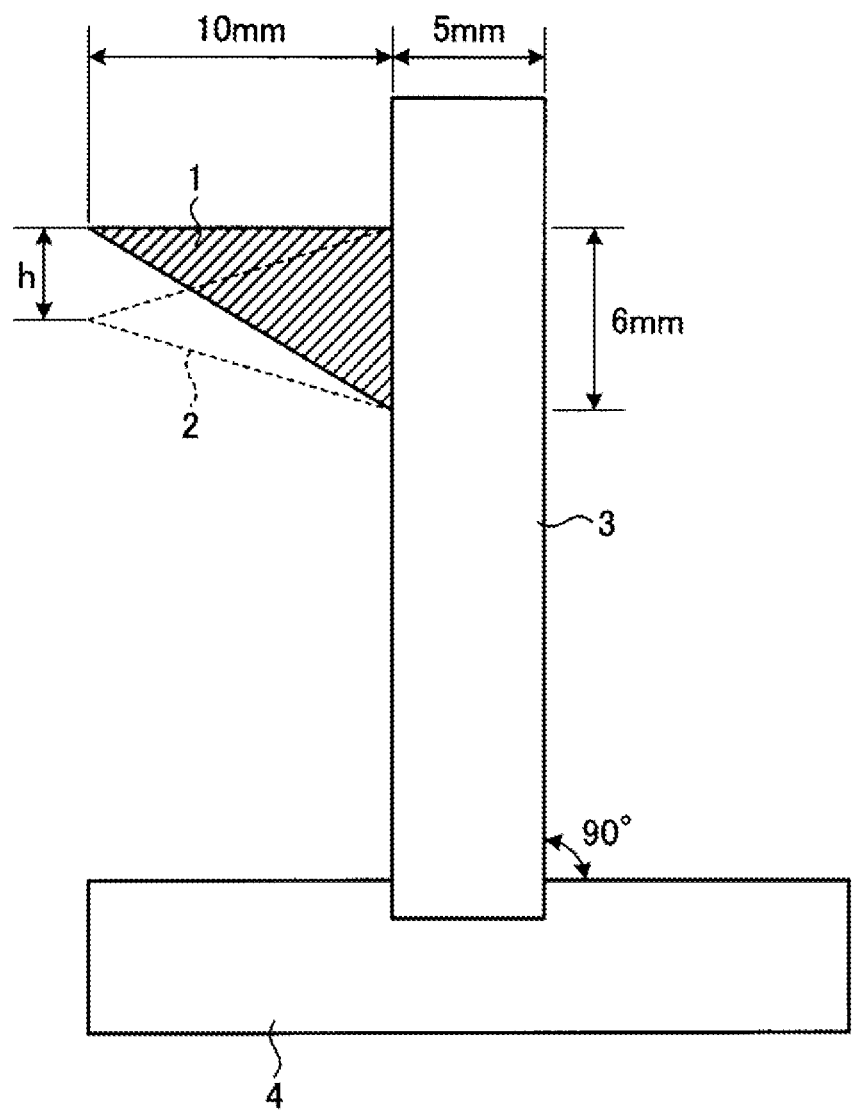
FIG. 1 is a conceptual view illustrating an example of a flow resistance test.

The present technology is explained in detail below. However, the present technology is not limited by the embodiments of the technology (hereinafter referred to as the "embodiments") described hereinafter. Furthermore, the constituents described in the embodiments include constituents that could be easily conceived by a person skilled in the art and constituents that are substantially identical, or, in other words, are equivalent in scope. Moreover, the constituents described in the embodiments can be combined as desired.

The one-pack moisture-curing composition of this embodiment (called the "composition of this embodiment" hereafter) contains a preliminary composition, an adhesiveness-imparting agent, a first catalyst, and a second catalyst.

<Preliminary Composition>

The preliminary composition contains a urethane prepolymer having isocyanate groups at the terminals and carbon black.

(Urethane Prepolymer)

A urethane prepolymer is a prepolymer containing a plurality of isocyanate groups at the molecular terminals in the molecule. From the perspective of handling, the urethane prepolymer is preferably a liquid at room temperature. The method of producing the urethane prepolymer is not particularly limited, and examples thereof include conventionally known methods. The urethane prepolymer is a reaction product obtained by reacting a polyisocyanate compound with a polyol compound, for example, so that isocyanate groups (NCO groups) are in excess relative to hydroxy groups (OH groups). A urethane prepolymer typically contains from 0.5 mass % to 10 mass % of NCO groups at the molecular terminals. These isocyanate groups may be bonded to either aromatic hydrocarbons or aliphatic hydrocarbons.

The polyisocyanate compound used to form the urethane prepolymer is not particularly limited provided it has two or more isocyanate groups in the molecule. Examples of polyisocyanate compounds include aromatic polyisocyanates such as 2,4-tolylene diisocyanate (2,4-TDI), 2,6-tolylene diisocyanate (2,6-TDI), 4,4'-diphenylmethane diisocyanate (4,4'-MDI), 2,2'-diphenylmethane diisocyanate (2,2'-MDI), 2,4'-diphenylmethane diisocyanate (2,4'-MDI), 1,4-phenylene diisocyanate, polymethylene polyphenylene polyisocyanate, tolidine diisocyanate (TODI), 1,5-naphthalene diisocyanate (NDI), xylylene diisocyanate (XDI), tetramethylxylylene diisocyanate (TMXDI), and triphenylmethane triisocyanate; aliphatic polyisocyanates such as hexamethylene diisocyanate (HDI), trimethylhexamethylene diisocyanate (TMHDI), lysine diisocyanate, and norbornane diisocyanate (NBDI); alicyclic polyisocyanates such as transcyclohexane-1,4-diisocyanate, isophorone diisocyanate (IPDI), bis(isocyanate methyl)cyclohexane ($H_6XDI$), and dicyclohexylmethane diisocyanate ($H_{12}MDI$); polyisocyanate compounds such as polymethylene polyphenylene polyisocyanate; carbodiimide-modified polyisocyanates of these isocyanate compounds; isocyanurate-modified polyisocyanates of these isocyanate compounds; and urethane prepolymers obtained by reacting these isocyanate compounds with the polyol compounds described below. These polyisocyanate compounds may be used alone or may be used in any combination of two or more types.

Of these polyisocyanate compounds, from the perspectives of ease of procurement and inexpensiveness, 4,4'-MDI is preferably used as the polyisocyanate compound used to synthesize the urethane prepolymer used in this embodiment.

The polyol compound used to produce the urethane prepolymer is not particularly limited and may be, for example, a polyether polyol, a polyester polyol, an acrylic polyol, a polycarbonate polyol, or another polyol. In addition, these polyols may be used alone or as a combination of two or more types. Specific examples of the polyol compound include polypropylene ether diol, polyethylene ether diol, polypropylene ether triol, polytetramethylene glycol, polyethylene glycol (PEG), polypropylene glycol (PPG), polyoxyethylene glycol, polyoxypropylene glycol, polyoxypropylene triol, polyoxybutylene glycol, polytetramethylene ether glycol (PTMG), polymer polyols, poly(ethylene adipate), poly(diethylene adipate), polypropylene adipate), poly(tetramethylene adipate), poly(hexamethylene adipate), poly(neopentylene adipate), poly-ε-caprolactone, and poly (hexamethylene carbonate). Moreover, natural type polyol compounds may be used such as castor oil or the like. The equivalent ratio of the polyol to polyisocyanate used to produce the urethane prepolymer is such that the equivalent ratio (NCO groups/OH groups) of isocyanate groups in the polyisocyanate to the hydroxy groups in the polyol is preferably from 1.2 to 2.2 and more preferably from 1.5 to 1.8.

The number average molecular weight of the urethane prepolymer is at least 2,000, preferably from 2,000 to 15,000, and more preferably from 2,000 to 10,000.

(Carbon Black)

The carbon black is not particularly limited, and an ordinarily commercially available product may be used. Examples of the carbon black include N110, N220, N330, N550, and N770 stipulated by the American Society for Testing and Materials, or mixtures thereof.

The compounding ratio of the carbon black is preferably from 10 parts by mass to 120 parts by mass and more preferably from 20 parts by mass to 90 parts by mass per 100 parts by mass of the urethane prepolymer in that the resulting composition of this embodiment has sufficient mechanical strength and can provide viscosity and thixotrophy (flow resistance) with excellent handleability. When the compounding ratio of the carbon black is within the range described above, the composition of this embodiment has excellent flow resistance. In this specification, flow resistance refers to the shape maintainability (also called thixotrophy) after the one-pack moisture-curing composition is applied.

The preliminary composition may also contain fillers, plasticizers, or the like in addition to the urethane prepolymer and the carbon black.

The fillers compounded with the preliminary composition are not particularly limited, and examples thereof include inorganic fillers such as calcium carbonate, aluminum hydroxide, white carbon, silica, glass, kaolin, talc (magnesium silicate), fumed silica, precipitated silica, silicic anhydride, hydrous silicic acid, clay, calcined clay, bentonite, glass fibers, asbestos, glass filaments, ground quartz, diatomaceous earth, aluminum silicate, zinc oxide, magnesium oxide, titanium oxide, or surface-treated products thereof; organic fillers such as carbonates, organic bentonite, high styrene resins, coumarone-indene resins, phenol resins, formaldehyde resins, modified melamine resins, cyclic rubbers, lignin, ebonite powder, shellac, cork powder, bone meal, wood meal, cellulose powder, coconut shell, and wood pulp; inorganic pigments such as lamp black, titanium white, red iron oxide, titanium yellow, zinc oxide, red lead, cobalt blue, iron black, and aluminum powder; and organic pigments such as Neozapon Black RE, Neoblack RE, Orasol Black CN, Orasol Black Ba (all produced by Ciba-Geigy), and Spiron Blue 2BH (produced by Hodogaya Chemical Co., Ltd.). Of these, it is preferable to use calcium carbonate in order to provide the desired characteristics. These calcium carbonates are not particularly limited, and an ordinarily commercially available product may be used. Examples of calcium carbonates include heavy calcium carbonate and precipitated calcium carbonate. Of these, heavy calcium carbonate is preferable from the perspective that it is possible to impart deep curability to the resulting composition of this embodiment. One type of these fillers may be used alone, or two or more types may be used in combination.

The compounding ratio of calcium carbonate is preferably from 10 parts by mass to 100 parts by mass and more preferably from 20 parts by mass to 80 parts by mass per 100 parts by mass of the urethane prepolymer in that the characteristic (called deep curability) that the entire composition of this embodiment including the surface layer and the interior is cured roughly uniformly is favorable.

The plasticizers compounded with the preliminary composition are not particularly limited, and examples thereof include tetrahydrophthalic acid, isophthalic acid, azelaic acid, benzoic acid, phthalic acid, trimellitic acid, pyromellitic acid, adipic acid, sebacic acid, fumaric acid, maleic acid, itaconic acid, and citric acid derivatives, polyesters, polyethers, and epoxy, paraffin, naphthene, and aromatic process oils. Of these, phthalic acid plasticizers and adipic acid plasticizers are preferable.

Examples of phthalic acid plasticizers include dioctyl phthalate (DOP), dibutyl phthalate (DBP), dilauryl phthalate (DLP), butyl benzyl phthalate (BBP), diisodecyl phthalate (DIDP), diisononyl phthalate (DINP), dimethyl phthalate, and diethyl phthalate. Of these, diisononyl phthalate and diisodecyl phthalate are preferable. Examples of adipic acid plasticizers include dioctyl adipate (DOA), diisononyl adipate (DINA), diisodecyl adipate, propylene glycol adipate polyester, and butylene glycol adipate polyester. Of these, diisononyl adipate is preferable. Examples of other plasticizers include dibutyl sebacate, diisodecyl succinate, diethylene glycol dibenzoate, pentaerythritol ester, butyl oleate, methyl acetyl ricinolate, trioctyl phosphate, tris(chloroethyl) phosphate, tris(dichloropropyl)phosphate, tricresyl phosphate, tributyl trimellitate (TBTM), trioctyl trimellitate (TOTM), alkyl epoxy stearate, epoxylated soy bean oils; and acrylic oligomers such as butyl acrylate with a molecular weight of from 500 to 10,000. These may be used alone, or two or more types may be used in combination.

The compounding ratio of the plasticizer is preferably from 10 parts by mass to 120 parts by mass and more preferably from 30 parts by mass to 100 parts by mass per 100 parts by mass of the urethane prepolymer from the perspective that the composition of this embodiment has moderate flexibility and viscosity with excellent handleability. When the compounding ratio of the plasticizer is within the range described above, the flow resistance and workability of the composition of this embodiment are favorable. When a plasticizer is used in the production of the urethane prepolymer, the content of the plasticizer in the composition is the sum of the amount of the plasticizer used in the production of the urethane prepolymer and the amount of a plasticizer mixed thereafter.

The production method of the preliminary composition is not particularly limited, and the compounding ratio of each component is also not particularly limited provided that the compounding ratio is within a range that does not depart from the object of this embodiment. Specifically, the preliminary composition used in this embodiment can be obtained, for example, by adding 70 parts by mass of carbon black, 20 parts by mass of calcium carbonate, and 50 parts by mass of a plasticizer to 100 parts by mass of the urethane prepolymer described above and then stirring under reduced pressure.

<Adhesiveness-imparting Agent>

The adhesiveness-imparting agent contains a compound (A) obtained by reacting diisocyanate and trimethylolpropane (TMP) or glycerin so that the equivalent ratio of isocyanate groups to hydroxyl groups is from 1.8 to 2.2 and/or a compound (B), which is a biuret form or isocyanurate form of diisocyanate. The compound (A) and the compound (B) are polyisocyanate compounds having three or more NCO groups.

[Compound (A)]
(Disocyanate Compound)

The diisocyanate compound is not particularly limited provided it has two or more isocyanate groups (NCO groups) in the molecule. Specific examples of diisocyanate compounds include aromatic isocyanates such as paraphenylene diisocyanate, tolylene diisocyanate (TDI), naphthalene diisocyanate (NDI), 4,4'-diphenylmethane diisocyanate (4,4'-MDI), 2,4'-diphenylmethane diisocyanate (2,4'-MDI), and tolidine diisocyanate (TODI); aliphatic isocyanates such as tetramethylene diisocyanate, hexamethylene diisocyanate (HDI), trimethylhexamethylene diisocyanate (TMHDI), lysine diisocyanate, norbornane diisocyanate (NBDI), and octadecyl diisocyanate; alicyclic isocyanates such as transcyclohexane-1,4-diisocyanate, isophorone diisocyanate (IPDI), and dicyclohexylmethane diisocyanate ($H_{12}$MDI); aryl aliphatic isocyanates such as xylene diisocyanate (XDI), hydrogenated xylylene diisocyanate (HXDI), and tetramethylxylylene diisocyanate (TMXDI); and modified isocyanates of each of the aforementioned isocyanates. One type of these may be used alone, or two or more types may be used in combination.

Of these, an aliphatic isocyanate is preferably used. Xylene diisocyanate (XDI) and hexamethylene diisocyanate (HDI) are preferably used as aliphatic isocyanates. One type of these may be used alone, or two or more types may be used in combination.

The compound (A) is a diisocyanate adduct obtained by reacting the aforementioned diisocyanate compound and trimethylolpropane (TMP) or glycerin so that the equivalent ratio of isocyanate groups to hydroxyl groups is from 1.8 to 2.2.

Specific examples of diisocyanate adducts include HDI-TMP or glycerin adducts obtained by reacting HDI with TMP or glycerin, XDI-TMP or glycerin adducts obtained by reacting XDI with TMP or glycerin, TDI-TMP or glycerin adducts obtained by reacting TDI with TMP or glycerin, TMXDI-TMP or glycerin adducts obtained by reacting TMXDI with TMP or glycerin, HXDI-TMP or glycerin adducts obtained by reacting HXDI with TMP, and IPDI-TMP or glycerin adducts obtained by reacting IPDI with TMP or glycerin. Of these, HDI-TMP adducts obtained by reacting HDI with TMP, XDI-TMP adducts obtained by reacting XDI with TMP, and the like may be preferably used from the perspective that the adhesiveness can be improved.

The synthesis of the compound (A) can be performed with the same method as that used in the production of an ordinary urethane prepolymer. For example, synthesis may be performed by stirring a diisocyanate compound and trimethylolpropane (TMP) or glycerin at the equivalent ratio described above while heating at a temperature of from 50° C. to 100° C. In addition, urethanization catalysts such as organotin compounds, organic bismuth, and amine, or the like may also be used as necessary.

A commercially available product may be used as an HDI-TMP adduct, and a specific example is D160N produced by Takeda Pharmaceutical Co., Ltd. A specific example of an XDI-TMP adduct is D110N produced by Takeda Pharmaceutical Co., Ltd.

The content of the compound (A) is from 0.1 parts by mass to 5.0 parts by mass, preferably from 0.3 parts by mass to 3.0 parts by mass, and more preferably from 0.5 parts by mass to 2.0 parts by mass per 100 parts by mass of the preliminary composition. When the content of the compound (A) is less than 0.1 parts by mass, the adhesiveness of the composition of this embodiment is diminished, which is not preferable. When the content of the compound (A) is greater than 5.0 parts by mass, the composition of this embodiment tends to become brittle, and the breaking elongation is diminished, which is not preferable. When the content of the compound (A) is within the range described above, the composition of this embodiment has fast adhesion expression, good curability, and sufficient adhesiveness. Furthermore, the crosslinking density becomes favorable, and the cured product is not brittle, so the product demonstrates excellent breaking elongation.

[Compound (B)]

The compound (B) is a biuret form or isocyanurate form of diisocyanate. Examples of a biuret form or isocyanurate form of a diisocyanate compound include a biuret of hexamethylene diisocyanate (also called an "HDI biuret" hereafter) and an isocyanurate of hexamethylene diisocyanate (also called an "HDI isocyanurate" hereafter). An HDI biuret form is represented by the following Formula (I), for example. An HDI isocyanurate form is represented by the following Formula (II), for example.

[Formula 1]

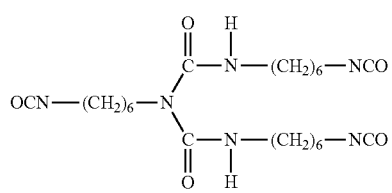

(I)

[Formula 2]

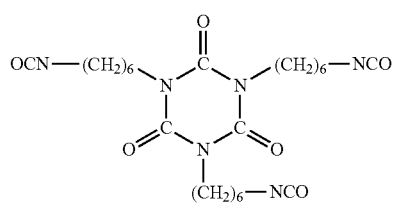

(II)

The HDI biuret form represented by the above Formula (I) and the HDI isocyanurate form represented by the above Formula (II) can be synthesized by known methods. In addition, commercially available products may be used. An example of a commercially available product of an HDI biuret form is D-165N produced by Mitsui Chemicals Polyurethanes, Inc. Examples of commercially available products of HDI isocyanurate forms include D-170N, D-170HN, D-172N, and D-177N produced by Mitsui Chemicals Polyurethanes, Inc.

Of these, an HDI biuret form and an HDI isocyanurate form can be suitably used for vehicles due to their high adhesiveness-imparting effects.

The content of the compound (B) is from 0.1 parts by mass to 5 parts by mass, preferably from 0.3 parts by mass to 3.0 parts by mass, and more preferably from 0.5 parts by mass to 2.0 parts by mass per 100 parts by mass of the preliminary composition. When the content of the compound (B) is less than 0.1 parts by mass, the adhesiveness of the composition of this embodiment is diminished, which is not preferable. When the content of the compound (B) is greater than 5 parts by mass, the composition of this embodiment tends to become brittle, and the breaking elongation is diminished, which is not preferable. When the content of the compound (B) is within the range described above, the composition of this embodiment has fast adhesion expression, good curability, and sufficient adhesiveness, and the product also demonstrates excellent breaking elongation.

In addition, the content when the adhesiveness-imparting agent contains both the compound (A) and the compound (B) satisfies the following Formula (1) with respect to 100 parts by mass of the preliminary composition when the content of the compound (A) is A parts by mass and the content of the compound (B) is B parts by mass.

$$0.1 \leq (A+B) \leq 5 \quad (1)$$

In other words, the content of the adhesiveness-imparting agent in terms of the total amount of the compound (A) and the compound (B) is from 0.1 parts by mass to 5.0 parts by mass, preferably from 0.3 parts by mass to 3.0 parts by mass, and more preferably from 0.5 parts by mass to 2.0 parts by mass per 100 parts by mass of the preliminary composition. When the content of the adhesiveness-imparting agent is less than 0.1 parts by mass, the adhesiveness of the composition of this embodiment is diminished, which is not preferable. When the content of the adhesiveness-imparting agent is greater than 5.0 parts by mass, the composition of this embodiment tends to become brittle, and the breaking elongation is diminished, which is not preferable. When the content of the adhesiveness-imparting agent is within the range described above, the composition of this embodiment can exhibit excellent adhesiveness to poorly adhesive adherends without performing surface treatment and also satisfies characteristics such as breaking elongation.

<First Catalyst>

The first catalyst contains a compound (C) obtained by reacting 1,3-diacetoxy-1,1,3,3-tetrabutyldistannoxane and ethyl silicate at a molar ratio within a range of from 1:0.8 to 1:1.2 and/or dibutyltin bis(pentadione).

(Compound (C))

The compound (C) is a reaction product of a tin catalyst and a silicic acid ester compound. By containing the compound (C) as the first catalyst, the composition of this embodiment can adhere an adherend to a poorly adhesive adherend without performing surface treatment, and the composition demonstrates excellent adhesiveness to various adherends such as poorly adhesive coated plates.

The compound (C) is obtained by reacting 1,3-diacetoxy-1,1,3,3-tetrabutyldistannoxane represented by the following Formula (III) with ethyl silicate at a molar ratio within a range of from 1:0.8 to 1:1.2.

[Formula 3]

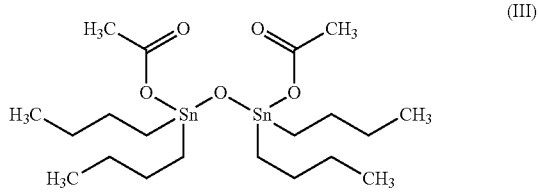

(III)

The 1,3-diacetoxy-1,1,3,3-tetrabutyldistannoxane represented by Formula (III) is an organotin catalyst and can be synthesized with a known method. For example, the catalyst can be obtained by reacting a dialkyl tin carboxylate, which is obtained by reacting a dialkyl tin oxide with an organic acid consisting of a monocarboxylic acid or monocarboxylic acid anhydride, with alkoxysilane.

The compound (C) can be synthesized with a known method. For example, the compound (C) can be synthesized by mixing 1,3-diacetoxy-1,1,3,3-tetrabutyldistannoxane and ethyl silicate at a molar ratio within a range of from 1:0.8 to 1:1.2 and reacting for 1 to 3 hours at a temperature of from 100° C. to 130° C.

The content of the compound (C) is from 0.001 parts by mass to 0.5 parts by mass, preferably from 0.005 parts by mass to 0.3 parts by mass, and more preferably from 0.01 parts by mass to 0.1 parts by mass per 100 parts by mass of the preliminary composition. When the content of the compound (C) is less than 0.001 parts by mass, the adhesiveness of the composition of this embodiment is diminished, which is not preferable. When the content of the compound (C) is greater than 0.5 parts by mass, the heat-resistant adhesiveness of the composition of this embodiment is diminished, which is not preferable. When the content of the compound (C) is within the range described above, the adhesiveness and the heat-resistant adhesiveness of the composition of this embodiment are favorable.

(Dibutyltin bis(pentadione))

Dibutyltin bis(pentadione) is a hexavalent organotin compound and a tin-based metal catalyst represented by the following Formula (IV). By containing dibutyltin bis(pentadione) as the first catalyst, the composition of this embodiment can adhere an adherend to a poorly adhesive adherend without performing surface treatment, and the composition demonstrates excellent adhesiveness to various adherends such as poorly adhesive coated plates.

[Formula 4]

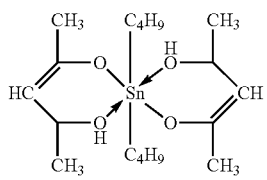

(IV)

A commercially available product may be used as dibutyltin bis(pentadione). A specific example thereof is NEOSTANN U-220H produced by Nitto Chemical Co., Ltd.

The content of dibutyltin bis(pentadione) is from 0.001 parts by mass to 0.5 parts by mass, preferably from 0.005 parts by mass to 0.3 parts by mass, and more preferably from 0.01 parts by mass to 0.1 parts by mass per 100 parts by mass of the preliminary composition. When the content of dibutyltin bis(pentadione) is less than 0.001 parts by mass, the adhesiveness of the composition of this embodiment is diminished, which is not preferable. When the content of dibutyltin bis(pentadione) is greater than 0.5 parts by mass, the heat-resistant adhesiveness of the composition of this embodiment is diminished, which is not preferable. When the content of dibutyltin bis(pentadione) is within the range described above, the adhesiveness and the heat-resistant adhesiveness of the composition of this embodiment are favorable.

In addition, the content when the first catalyst contains both the compound (C) and dibutyltin bis(pentadione) satisfies the relationship of the following Formula (2) when the content of the compound (C) is C parts by mass and the content of dibutyltin bis(pentadione) is D parts by mass.

$$0.001 \leq (C+D) \leq 0.5 \quad (2)$$

In other words, the content of the first catalyst in terms of the total amount of the compound (C) and dibutyltin bis(pentadione) is from 0.001 parts by mass to 0.5 parts by mass, preferably from 0.005 parts by mass to 0.3 parts by mass, and more preferably from 0.01 parts by mass to 0.1 parts by mass per 100 parts by mass of the preliminary composition. When the content of the first catalyst is less than 0.001 parts by mass, the adhesiveness of the composition of this embodiment is diminished, which is not preferable. When the content of the first catalyst is greater than 0.5 parts by mass, the heat-resistant adhesiveness of the composition of this embodiment is diminished, which is not preferable. When the content of the first catalyst is within the range described above, the composition of this embodiment exhibits excellent adhesiveness to poorly adhesive adherends without performing surface treatment and also satisfies characteristics such as heat-resistant adhesiveness and breaking elongation.

Since the composition of this embodiment contains the first catalyst, it catalyzes reactions between the isocyanate groups of the urethane prepolymer and active hydrogen on the surface of the adherend, so the resulting composition has excellent adhesiveness to various adherends such as poorly adhesive coated plates and has also excellent heat-resistant adhesiveness. In addition, the first catalyst can also favorably maintain the viscosity of the urethane prepolymer.

<Second Catalyst>

The second catalyst contains a dimorpholinodiethylether (DMDEE) represented by the following Formula (V), which is an amine catalyst. The dimorpholinodiethylether catalyzes reactions between the isocyanate groups of the urethane prepolymer and moisture in the air, so the resulting composition has excellent curability and flow resistance. In addition, the dimorpholinodiethylether (DMDEE) is unlikely to catalyze reactions between isocyanate groups and active hydrogen other than water, so the resulting composition has excellent storage stability.

[Formula 5]

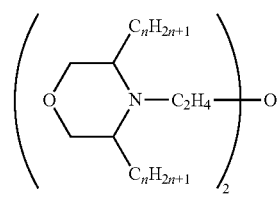

(V)

(In Formula (V), n is 0 or 1.)

In order to exhibit the excellent characteristics described above, the content of the dimorpholinodiethylether (DMDEE) satisfies the following Formula (3) with respect to 100 parts by mass of the preliminary composition when the content of the dimorpholinodiethylether is E parts by mass.

$$0.01 \leq E \leq 2 \quad (3)$$

In other words, the content of the dimorpholinodiethylether (DMDEE) is from 0.01 parts by mass to 2.0 parts by mass, preferably from 0.05 parts by mass to 1.5 parts by mass, and more preferably from 0.05 parts by mass to 1.0 parts by mass per 100 parts by mass of the preliminary composition. When the content of the dimorpholinodiethylether is less than 0.01 parts by mass or greater than 2.0 parts by mass, the curability and high-temperature/high-humidity adhesiveness of the composition of this embodiment are diminished, which is not preferable. When the content of the dimorpholinodiethylether is within the range described above, the composition of this embodiment exhibits excellent adhesiveness to poorly adhesive adherends without performing surface treatment and exhibits excellent curability, high-temperature/high-humidity adhesiveness, flow resistance, and storage stability.

The second catalyst may further contain N,N-dimethylamino ethylmorpholine represented by the following Formula (VI), which is an amine catalyst. N,N-dimethylamino ethylmorpholine catalyzes reactions between the isocyanate groups of the urethane prepolymer and moisture in the air, so the resulting composition has excellent high-temperature/high-humidity adhesiveness and curability.

[Formula 6]

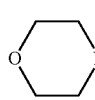

(VI)

In order to exhibit the excellent characteristics described above, the content of N,N-dimethylamino ethylmorpholine satisfies the following Formula (4) with respect to 100 parts by mass of the preliminary composition when the content of N,N-dimethylamino ethylmorpholine is F parts by mass.

$$F \leq 2 \quad (4)$$

In other words, the content of N,N-dimethylamino ethylmorpholine is at most 2.0 parts by mass, preferably from 0.1 parts by mass to 2.0 parts by mass, and more preferably from 0.5 parts by mass to 1.0 parts by mass per 100 parts by mass of the preliminary composition. When the content of N,N-dimethylamino ethylmorpholine is less than 0.1 parts by mass, the curability of the composition of this embodiment is diminished, which is not preferable. When the content of N,N-dimethylamino ethylmorpholine is greater than 2.0 parts by mass, the curability, flow resistance and storage stability of the composition of this embodiment are diminished, which is not preferable. When the content of N,N-dimethylamino ethylmorpholine is within the range described above, the composition of this embodiment exhibits excellent adhesiveness to poorly adhesive adherends without performing surface treatment and exhibits excellent high-temperature/high-humidity adhesiveness and curability.

In addition, the content when the second catalyst contains both a dimorpholinodiethylether and N,N-dimethylamino ethylmorpholine satisfies the following Formulas (5) and (6) with respect to 100 parts by mass of the preliminary composition when the content of the dimorpholinodiethylether is E parts by mass and the content of the N,N-dimethylamino ethylmorpholine is F parts by mass.

$$F \leq E \quad (5)$$

$$0.1 \leq (E+F) \leq 2 \quad (6)$$

In other words, the content of the second catalyst in terms of the total amount of the dimorpholinodiethylether and N,N-dimethylamino ethylmorpholine is from 0.1 parts by mass to 2.0 parts by mass, preferably from 0.3 parts by mass to 1.5 parts by mass, and more preferably from 0.5 parts by mass to 1.0 parts by mass per 100 parts by mass of the preliminary composition. In addition, the content of the dimorpholinodiethylether in the second catalyst is preferably greater than the content of the N,N-dimethylamino ethylmorpholine. When the content of the second catalyst is less than 0.1 parts by mass, the curability and high-temperature/high-humidity adhesiveness of the composition of this embodiment are diminished, which is not preferable. When the content of the second catalyst is greater than 2.0 parts by mass, the curability, high-temperature/high-humidity adhesiveness, flow resistance, and storage stability of the composition of this embodiment are diminished, which is not preferable. When the content of the second catalyst is within the range described above, the composition of this embodiment exhibits excellent adhesiveness to poorly adhesive adherends without performing surface treatment and exhibits excellent curability, high-temperature/high-humidity adhesiveness, flow resistance, and storage stability.

The composition of this embodiment may also contain additives in addition to the preliminary composition, the adhesiveness-imparting agent, the first catalyst, the second catalyst, and each of the optional components described above as necessary within a range that does not diminish the object of the present technology. In addition to plasticizers, fillers, adhesiveness-imparting agents, and curing accelerators (catalysts), examples of additives include curing agents, reactive diluents, thixotropy-imparting agents, silane coupling agents, pigments, dyes, anti-aging agents, antioxidants, antistatic agents, flame retardants, drying oils, tackifiers, dispersants, dehydrating agents, ultraviolet absorbers, and solvents. The composition may contain two or more types of these additives. The additives and the like may be kneaded and formed into a composition according to a general method and used in crosslinking. The compounding ratio of these additives may be any conventional standard ratio, so long as the objects of this embodiment are not hindered.

The production method of the composition of this embodiment is not particularly limited. For example, a one-pack moisture-curing composition which is the composition of this embodiment can be formed by adding the preliminary composition, the adhesiveness-imparting agent, the first catalyst, the second catalyst, and the optional components and sufficiently kneading under reduced pressure.

The usage method of the composition of this embodiment is not particularly limited. For example, after the composition is coated on an adherend, it is attached to a non-adherend, and both adherends are pressed together to form a bonded structure.

In this way, the composition of this embodiment contains a preliminary composition, an adhesiveness-imparting agent containing a compound (A) and/or a compound (B), a first catalyst containing a compound (C) and/or dibutyltin bis (pentadione), and a second catalyst containing a dimorpholinodiethylether within respectively prescribed ranges. Therefore, the composition of this embodiment exhibits excellent adhesiveness, which makes it possible to adhere a glass adherend to a poorly adhesive adherend without performing surface treatment, and also satisfies characteristics such as high-temperature/high-humidity adhesiveness, curing rate, flow resistance, storage stability, heat-resistant adhesiveness, and breaking elongation.

Therefore, the composition of this embodiment can be used as an adhesive for adhering to a painted surface and glass of a vehicle, and a window glass can be adhered to a vehicle without using a primer, so the composition can be used as an adhesive which stably exhibits potent adhesive strength.

The applications, application conditions, and the like of the composition of this embodiment are not particularly limited, but since the composition has excellent characteristics such as those described above, it can be suitably used as an adhesive or the like for a so-called poorly adhesive coated plate coated with a high solid coating, an acid rain-resistant coating, an easy-maintenance coating, or the like in addition to vehicle fields such as an adhesive used to adhere a vehicle body and a window glass.

EXAMPLES

The composition of this embodiment is described in detail below using Working Examples, but this embodiment is not limited to these Working Examples.

<Production of Urethane Prepolymer>

First, 200 g of polypropylene ether triol with a number average molecular weight of 5,000 (G-5000, trade name "EXCENOL 5030", produced by Asahi Glass Co., Ltd.) and 600 g of polypropylene ether diol with a number average molecular weight of 2,000 (D-2000, trade name EXCENOL 2020", produced by Asahi Glass Co., Ltd.) were charged into a flask and heated to 100° C. to 130° C., and the mixture was dehydrated by stirring while degassing until the moisture content was 0.01% or less. The mixture was then cooled to 90° C., and after diphenylmethane diisocyanate (MDI, trade name "Sumidule 44S", produced by Sumika Bayer Urethane Co., Ltd.) was added in an amount so that the molar ratio of NCO groups/OH groups was 1.8, the reaction was progressed for approximately 24 hours in a nitrogen atmosphere to produce a urethane prepolymer with an NCO content of 2.0%.

<Production of Preliminary Composition>

70 parts by mass of carbon black (trade name: Elf Tech 8, produced by the Cabot Corporation), 20 parts by mass of calcium carbonate (heavy calcium carbonate, trade name: SB Blue, produced by Shiraishi Calcium Co., Ltd.), and 50 parts by mass of a plasticizer (diisononyl phthalate (DINP), produced by Mitsubishi Chemical Corporation) were added to 100 parts by mass of the urethane prepolymer obtained in this way and then mixed for one hour under vacuum using a mixer to obtain a preliminary composition.

<Synthesis of Adhesiveness-imparting Agent (Compound (A))>

A compound (A) (NCO groups: 22.2 mass %) was obtained by reacting a composition prepared by dissolving 245 g of 1,1,1-trimethylolpropane (produced by Mitsubishi Gas Chemical Co., Ltd.) in methyl ethyl ketone (MEK) while stirring 100 g of HDI (trade name: Duranate 50M-HDI, NCO groups: 50 mass %, produced by Asahi Kasei Chemicals Co., Ltd.) so that the ratio of NCO groups/OH groups was 2.0 in a $N_2$ gas flow while adding the composition dropwise to HDI.

<Synthesis of First Catalyst (Compound (C))>

A compound (C) was obtained by uniformly mixing 100 g of 1,3-diacetoxy-1,1,3,3-tetrabutyldistannoxane (produced by Osaka New Chemical Co., Ltd.) and 288 g of ethyl silicate (tetraethoxysilane, produced by Elcot Co., Ltd.) and reacting for 24 hours while stirring under conditions with a reaction temperature of from 55° C. to 65° C.

<Production of One-pack Moisture-curing Composition>

The respective components shown in Tables 1 to 5 were blended in the added amounts (parts by mass) shown in these tables, and these were uniformly mixed to prepare each of the one-pack moisture-curing compositions (simply called "compositions" hereafter) of the Working Examples 1 to 20 and Comparative Examples 1 to 32 shown in Tables 1 to 5. The added amounts (parts by mass) of the respective components in each of the working examples and comparative examples are shown in Tables 1 to 5.

The high-temperature/high-humidity adhesiveness, curing rate, flow resistance, storage stability, heat-resistant adhesiveness, breaking elongation, and adhesiveness (coated plates 1 to 3) were evaluated with the methods described below for each of the compositions obtained above. The results are shown in Tables 1 to 5.

<High-temperature/High-humidity Adhesiveness>

A glass primer (trade name: MS-90, produced by Yokohama Rubber Co., Ltd.) was applied to a glass adherend for adhesiveness evaluation, and after this was left to stand for 2 minutes at 20° C., each composition obtained above was applied in a bead formation with a thickness of 3 mm to form a test piece. After this test piece was left to stand for 3 hours in an atmosphere at 20° C. and 60 RH %, the test piece was immersed for 24 hours in warm water at 40° C. One end of the cured product of each composition formed on the test piece was then held and peeled back by 180 degrees to evaluate the failure state. The evaluation results of the failure state are shown in Tables 1 to 5. CF is the area ratio of the cohesive failure of the cured product; AF is the area ratio of the interfacial failure between the coated plate and the cured product; and PS is the area ratio of the interfacial failure between the primer composition and the cured product. The results were evaluated as favorable in the case of CF. The results are shown in Tables 1 to 5.

<Curing Rate>

Each composition obtained above was applied in a bead formation with a thickness of 3 mm to a glass adherend for adhesiveness evaluation to form a test piece. This test piece was left to stand in an atmosphere at 20° C. and 60 RH %, and after a polyethylene film was attached to the surface of each composition, the film was pulled up, and the time required until each composition no longer adhered to the polyethylene film (skinning time) was measured. The skinning time was evaluated as ○ when the time was at least 20 minutes and at most 70 minutes, as Δ when the time was greater than 70 minutes and less than 100 minutes, and as x in other case. The results were assessed as favorable in the cases of ○ and Δ. The results are shown in Tables 1 to 5.

<Flow Resistance>

Flow resistance tests were performed to evaluate the shape maintainability (thixotrophy) of each composition. FIG. 1 is a conceptual view illustrating an example of a flow resistance test. As illustrated in FIG. 1, each composition 1 obtained above was extruded in a strip of right triangular beads with a base of 6 mm and a height of 10 mm onto a glass plate 3 with a thickness of 5 mm, and a holder 4 was immediately attached to the glass plate 3 and held at an angle of 90°. The distance h of the sag of the vertice of each composition 2 after being left to stand for 30 minutes in an atmosphere at 20° C. and 65 RH % was measured. The results were evaluated as favorable when the distance h was 0 mm, fair when the distance h was greater than 0 mm and at most 1.5 mm, and poor in other cases. The results are shown in Tables 1 to 5.

<Storage Stability>

A sealed container was filled with each composition obtained above and then nitrogen-substituted. After this was left to stand for 7 days in an atmosphere at 40° C., the extrusion viscosity was measured, and the thickening rate (%) with respect to the initial viscosity was determined. The results were evaluated as favorable when the thickening rate was 20% or less, fair when the thickening rate was greater than 20% and less than 25%, and poor when the thickening rate was 25% or greater. The results are shown in Tables 1 to 5.

<Heat-resistant Adhesiveness>

A glass primer (trade name: MS-90, produced by Yokohama Rubber Co., Ltd.) was applied to a glass adherend for adhesiveness evaluation, and after this was left to stand for 2 minutes at 20° C., each composition obtained above was applied in a bead formation with a thickness of 3 mm to form a test piece. After this test piece was left to stand for 7 days in an atmosphere at 20° C. and 60 RH %, it was left to stand for 5 days in an atmosphere at 120° C. and then gradually cooled to 20° C. One end of the cured product of each composition formed on the test piece was then held and peeled back by 180 degrees to evaluate the failure state. The evaluation results of the failure state are shown in Tables 1 to 5. CF is the area ratio of the cohesive failure of the cured product; AF is the area ratio of the interfacial failure between the coated plate and the cured product; and PS is the area ratio of the interfacial failure between the primer composition and the cured product. The results were evaluated as favorable in the case of CF. The results are shown in Tables 1 to 5.

<Breaking Elongation>

A cured product of each composition obtained above was cut out into a dumbbell-shaped test piece with a thickness of 2 mm (No. 3 dumbbell shape), and the breaking elongation (%) was measured in accordance with JIS K6251-1993. The results were evaluated as favorable when the breaking elongation was 300% or greater, fair when the breaking elongation was at least 270% and less than 300%, and poor in other cases. The results are shown in Tables 1 to 5.

<Adhesiveness to Coated Plates 1 to 3>

After the surfaces of a coated plate 1 (acid epoxy coated plate), a coated plate 2 (acid epoxy coated plate), and a coated plate 3 (acrylic melamine coated plate) were washed with white gasoline, each composition obtained above was applied directly in a bead formation with a thickness of 3 mm without using a primer to form a test piece. After this test piece was left to stand for 7 days in an atmosphere at 20° C. and 60 RH %, it was immersed for 7 days in warm water at 40° C. One end of the cured product of each composition formed on the test piece was then held and peeled back by 180 degrees in an atmosphere at 20° C. to evaluate the failure state. The evaluation results of the failure state are shown in Tables 1 to 5. CF is the area ratio of the cohesive failure of the cured product; AF is the area ratio of the interfacial failure between the coated plate and the cured product; and PS is the area ratio of the interfacial failure between the primer composition and the cured product. The results were evaluated as favorable in the case of CF. The results are shown in Tables 1 to 5.

TABLE 1

| | | Working Example 1 | Working Example 2 | Working Example 3 | Working Example 4 | Working Example 5 |
|---|---|---|---|---|---|---|
| Preliminary composition | | 100 | 100 | 100 | 100 | 100 |
| Adhesiveness-imparting agent | Compound A | 0.1 | — | 0.05 | 5 | — |
| | Compound B | — | 0.1 | 0.05 | — | 5 |
| First catalyst | Compound C | 0.01 | 0.01 | 0.01 | 0.01 | 0.01 |
| | Dibutyltin bis(pentadione) | — | — | — | — | — |
| Second catalyst | Dimorpholinodiethylether | 0.5 | 0.5 | 0.5 | 0.5 | 0.5 |
| | N,N-dimethylamino ethylmorpholine | 0.25 | 0.25 | 0.25 | 0.25 | 0.25 |
| TDI isocyanurate form | | — | — | — | — | — |
| Dibutyltin dilaurate | | — | — | — | — | — |
| High-temperature/high-humidity adhesiveness | | CF100 | CF100 | CF100 | CF100 | CF100 |
| Curing rate | | ◯ | ◯ | ◯ | ◯ | ◯ |
| Flow resistance (mm) | | 0 | 0 | 0 | 0 | 0 |
| Storage stability(%) | | 15 | 17 | 15 | 15 | 18 |
| Heat-resistant adhesiveness | | CF100 | CF100 | CF100 | CF100 | CF100 |
| Breaking elongation(%) | | 350 | 330 | 330 | 290 | 280 |
| Adhesiveness (coated plate 1) | | CF100 | CF100 | CF100 | CF100 | CF100 |
| Adhesiveness (coated plate 2) | | CF100 | CF100 | CF100 | CF100 | CF100 |
| Adhesiveness (coated plate 3) | | CF100 | CF100 | CF100 | CF100 | CF100 |

| | | Working Example 6 | Working Example 7 | Working Example 8 | Working Example 9 | Working Example 10 |
|---|---|---|---|---|---|---|
| Preliminary composition | | 100 | 100 | 100 | 100 | 100 |
| Adhesiveness-imparting agent | Compound A | 2.5 | 1 | 1 | 1 | 1 |
| | Compound B | 2.5 | 1 | 1 | 1 | 1 |
| First catalyst | Compound C | 0.01 | 0.001 | — | 0.0005 | 0.5 |
| | Dibutyltin bis(pentadione) | — | — | 0.001 | 0.0005 | — |
| Second catalyst | Dimorpholinodiethylether | 0.5 | 0.5 | 0.5 | 0.5 | 0.5 |
| | N,N-dimethylamino ethylmorpholine | 0.25 | 0.25 | 0.25 | 0.25 | 0.25 |
| TDI isocyanurate form | | — | — | — | — | — |
| Dibutyltin dilaurate | | — | — | — | — | — |

TABLE 1-continued

|  | | | | | |
|---|---|---|---|---|---|
| High-temperature/high-humidity adhesiveness | CF100 | CF100 | CF100 | CF100 | CF100 |
| Curing rate | ○ | ○ | ○ | ○ | ○ |
| Flow resistance (mm) | 0 | 0 | 0 | 0 | 0 |
| Storage stability(%) | 18 | 15 | 16 | 18 | 20 |
| Heat-resistant adhesiveness | CF100 | CF100 | CF100 | CF100 | CF100 |
| Breaking elongation(%) | 290 | 320 | 320 | 330 | 310 |
| Adhesiveness (coated plate 1) | CF100 | CF100 | CF100 | CF100 | CF100 |
| Adhesiveness (coated plate 2) | CF100 | CF100 | CF100 | CF100 | CF100 |
| Adhesiveness (coated plate 3) | CF100 | CF100 | CF100 | CF100 | CF100 |

TABLE 2

| | | Working Example 11 | Working Example 12 | Working Example 13 | Working Example 14 | Working Example 15 |
|---|---|---|---|---|---|---|
| Preliminary composition | | 100 | 100 | 100 | 100 | 100 |
| Adhesiveness-imparting agent | Compound A | 1 | 1 | 1 | 1 | 1 |
| | Compound B | 1 | 1 | 1 | 1 | 1 |
| First catalyst | Compound C | — | 0.25 | 0.01 | 0.01 | 0.01 |
| | Dibutyltin bis(pentadione) | 0.5 | 0.25 | — | — | — |
| Second catalyst | Dimorpholinodiethylether | 0.5 | 0.5 | 1 | 2 | 1.75 |
| | N,N-dimethylamino ethylmorpholine | 0.25 | 0.25 | 1 | — | 0.25 |
| | TDI isocyanurate form | — | — | — | — | — |
| | Dibutyltin dilaurate | — | — | — | — | — |
| High-temperature/high-humidity adhesiveness | | CF100 | CF100 | CF100 | CF100 | CF100 |
| Curing rate | | ○ | ○ | Δ | ○ | Δ |
| Flow resistance (mm) | | 0 | 0 | 1 | 0 | 0 |
| Storage stability (%) | | 22 | 20 | 22 | 18 | 20 |
| Heat-resistant adhesiveness | | CF100 | CF100 | CF100 | CF100 | CF100 |
| Breaking elongation(%) | | 330 | 320 | 340 | 330 | 310 |
| Adhesiveness (coated plate 1) | | CF100 | CF100 | CF100 | CF100 | CF100 |
| Adhesiveness (coated plate 2) | | CF100 | CF100 | CF100 | CF100 | CF100 |
| Adhesiveness (coated plate 3) | | CF100 | CF100 | CF100 | CF100 | CF100 |
| | | Working Example 16 | Working Example 17 | Working Example 18 | Working Example 19 | Working Example 20 |
| Preliminary composition | | 100 | 100 | 100 | 100 | 100 |
| Adhesiveness-imparting agent | Compound A | 1 | 1 | 1 | 1 | 1 |
| | Compound B | 1 | 1 | 1 | 1 | 1 |
| First catalyst | Compound C | 0.01 | 0.01 | 0.01 | 0.01 | 0.01 |
| | Dibutyltin bis(pentadione) | — | — | — | — | — |
| Second catalyst | Dimorpholinodiethylether | 0.5 | 0.1 | 0.05 | 0.5 | 1 |
| | N,N-dimethylamino ethylmorpholine | — | — | 0.05 | 0.5 | 0.25 |
| | TDI isocyanurate form | — | — | — | — | — |
| | Dibutyltin dilaurate | — | — | — | — | — |
| High-temperature/high-humidity adhesiveness | | CF100 | CF100 | CF100 | CF100 | CF100 |
| Curing rate | | ○ | Δ | ○ | ○ | ○ |
| Flow resistance (mm) | | 0 | 0 | 0 | 0.5 | 0.2 |
| Storage stability (%) | | 15 | 12 | 15 | 18 | 18 |
| Heat-resistant adhesiveness | | CF100 | CF100 | CF100 | CF100 | CF100 |
| Breaking elongation(%) | | 330 | 330 | 340 | 320 | 330 |
| Adhesiveness (coated plate 1) | | CF100 | CF100 | CF100 | CF100 | CF100 |
| Adhesiveness (coated plate 2) | | CF100 | CF100 | CF100 | CF100 | CF100 |
| Adhesiveness (coated plate 3) | | CF100 | CF100 | CF100 | CF100 | CF100 |

TABLE 3

| | | Comparative Example 1 | Comparative Example 2 | Comparative Example 3 | Comparative Example 4 | Comparative Example 5 |
|---|---|---|---|---|---|---|
| Preliminary composition | | 100 | 100 | 100 | 100 | 100 |
| Adhesiveness-imparting agent | Compound A | 5 | — | 2.5 | 2.5 | 2.5 |
| | Compound B | — | 5 | 2.5 | 2.5 | 2.5 |

TABLE 3-continued

|  |  |  |  |  |  |  |
|---|---|---|---|---|---|---|
| First catalyst | Compound C | — | — | — | 0.0008 | — |
|  | Dibutyltin bis(pentadione) | — | — | — | — | 0.0008 |
| Second catalyst | Dimorpholinodiethylether | 0.5 | 0.5 | 0.5 | 0.5 | 0.5 |
|  | N,N-dimethylamino ethylmorpholine | 0.25 | 0.25 | 0.25 | 0.25 | 0.25 |
|  | TDI isocyanurate form | — | — | — | — | — |
|  | Dibutyltin dilaurate | 0.01 | 0.01 | 0.01 | — | — |
| High-temperature/high-humidity adhesiveness |  | CF100 | CF100 | CF100 | CF100 | CF100 |
| Curing rate |  | ○ | ○ | ○ | ○ | ○ |
| Flow resistance (mm) |  | 0 | 0 | 0 | 0 | 0 |
| Storage stability (%) |  | 18 | 15 | 15 | 18 | 15 |
| Heat-resistant adhesiveness |  | CF100 | CF100 | CF100 | CF100 | CF100 |
| Breaking elongation (%) |  | 290 | 280 | 290 | 290 | 290 |
| Adhesiveness (coated plate 1) |  | CF100 | CF100 | CF100 | CF100 | CF100 |
| Adhesiveness (coated plate 2) |  | AF10 | AF30 | AF20 | CF100 | CF100 |
| Adhesiveness (coated plate 3) |  | AF50 | AF80 | AF50 | AF10 | AF10 |

|  |  | Comparative Example 6 | Comparative Example 7 | Comparative Example 8 | Comparative Example 9 | Comparative Example 10 |
|---|---|---|---|---|---|---|
| Preliminary composition |  | 100 | 100 | 100 | 100 | 100 |
| Adhesiveness-imparting agent | Compound A | 1 | 0.08 | — | 0.04 | 0.08 |
|  | Compound B | — | — | 0.08 | 0.04 | — |
| First catalyst | Compound C | — | 0.01 | 0.01 | 0.5 | — |
|  | Dibutyltin bis(pentadione) | — | — | — | — | 0.01 |
| Second catalyst | Dimorpholinodiethylether | 0.5 | 0.5 | 0.5 | 0.5 | 0.5 |
|  | N,N-dimethylamino ethylmorpholine | 0.25 | 0.25 | 0.25 | 0.25 | 0.25 |
|  | TDI isocyanurate form | — | — | — | — | — |
|  | Dibutyltin dilaurate | 0.01 | — | — | — | — |
| High-temperature/high-humidity adhesiveness |  | CF100 | CF100 | CF100 | CF100 | CF100 |
| Curing rate |  | ○ | ○ | ○ | ○ | ○ |
| Flow resistance (mm) |  | 0 | 0 | 0 | 0 | 0 |
| Storage stability (%) |  | 15 | 16 | 15 | 20 | 16 |
| Heat-resistant adhesiveness |  | CF100 | CF100 | CF100 | CF100 | CF100 |
| Breaking elongation (%) |  | 390 | 420 | 400 | 390 | 310 |
| Adhesiveness (coated plate 1) |  | CF100 | CF100 | CF100 | CF100 | CF100 |
| Adhesiveness (coated plate 2) |  | AF30 | CF100 | CF100 | CF100 | CF100 |
| Adhesiveness (coated plate 3) |  | AF100 | AF50 | AF30 | AF50 | AF50 |

TABLE 4

|  |  | Comparative Example 11 | Comparative Example 12 | Comparative Example 13 | Comparative Example 14 |
|---|---|---|---|---|---|
| Preliminary composition |  | 100 | 100 | 100 | 100 |
| Adhesiveness-imparting agent | Compound A | — | 0.04 | 2 | — |
|  | Compound B | 0.08 | 0.04 | — | 2 |
| First catalyst | Compound C | — | — | 0.6 | — |
|  | Dibutyltin bis(pentadione) | 0.01 | 0.5 | — | 0.6 |
| Second catalyst | Dimorpholinodiethylether | 0.5 | 0.5 | 0.5 | 0.5 |
|  | N,N-dimethylamino ethylmorpholine | 0.25 | 0.25 | 0.25 | 0.25 |
|  | TDI isocyanurate form | — | — | — | — |
|  | Dibutyltin dilaurate | — | — | — | — |
| High-temperature/high-humidity adhesiveness |  | CF100 | CF100 | CF100 | CF100 |
| Curing rate |  | ○ | ○ | ○ | ○ |
| Flow resistance (mm) |  | 0 | 0 | 0 | 0 |
| Storage stability (%) |  | 14 | 22 | 22 | 28 |
| Heat-resistant adhesiveness |  | CF100 | CF100 | PS20 | PS80 |
| Breaking elongation (%) |  | 420 | 400 | 380 | 350 |
| Adhesiveness (coated plate 1) |  | CF100 | CF100 | CF100 | CF100 |
| Adhesiveness (coated plate 2) |  | CF100 | CF100 | CF100 | CF100 |
| Adhesiveness (coated plate 3) |  | AF50 | AF30 | CF100 | CF100 |

TABLE 4-continued

|  |  | Comparative Example 15 | Comparative Example 16 | Comparative Example 17 | Comparative Example 18 |
|---|---|---|---|---|---|
| Preliminary composition | | 100 | 100 | 100 | 100 |
| Adhesiveness-imparting agent | Compound A | 2 | 6 | — | 3 |
| | Compound B | — | — | 6 | 3 |
| First catalyst | Compound C | 0.3 | 0.01 | 0.01 | 0.01 |
| | Dibutyltin bis(pentadione) | 0.3 | — | — | — |
| Second catalyst | Dimorpholinodiethylether | 0.5 | 0.5 | 0.5 | 0.5 |
| | N,N-dimethylamino ethylmorpholine | 0.25 | 0.25 | 0.25 | 0.25 |
| TDI isocyanurate form | | — | — | — | — |
| Dibutyltin dilaurate | | — | — | — | — |
| High-temperature/high-humidity adhesiveness | | CF100 | CF100 | CF100 | CF100 |
| Curing rate | | ◯ | ◯ | ◯ | ◯ |
| Flow resistance (mm) | | 0 | 0 | 0 | 0 |
| Storage stability (%) | | 23 | 18 | 20 | 16 |
| Heat-resistant adhesiveness | | PS30 | CF100 | CF100 | CF100 |
| Breaking elongation (%) | | 350 | 240 | 250 | 250 |
| Adhesiveness (coated plate 1) | | CF100 | CF100 | CF100 | CF100 |
| Adhesiveness (coated plate 2) | | CF100 | CF100 | CF100 | CF100 |
| Adhesiveness (coated plate 3) | | CF100 | CF100 | CF100 | CF100 |

|  |  | Comparative Example 19 | Comparative Example 20 | Comparative Example 21 |
|---|---|---|---|---|
| Preliminary composition | | 100 | 100 | 100 |
| Adhesiveness-imparting agent | Compound A | 6 | — | 3 |
| | Compound B | — | 6 | 3 |
| First catalyst | Compound C | 0.01 | 0.01 | 0.01 |
| | Dibutyltin bis(pentadione) | — | — | — |
| Second catalyst | Dimorpholinodiethylether | 0.5 | 0.5 | 0.5 |
| | N,N-dimethylamino ethylmorpholine | 0.25 | 0.25 | 0.25 |
| TDI isocyanurate form | | — | — | — |
| Dibutyltin dilaurate | | — | — | — |
| High-temperature/high-humidity adhesiveness | | CF100 | CF100 | CF100 |
| Curing rate | | ◯ | ◯ | ◯ |
| Flow resistance (mm) | | 0 | 0 | 0 |
| Storage stability (%) | | 18 | 18 | 15 |
| Heat-resistant adhesiveness | | CF100 | CF100 | CF100 |
| Breaking elongation (%) | | 220 | 240 | 260 |
| Adhesiveness (coated plate 1) | | CF100 | CF100 | CF100 |
| Adhesiveness (coated plate 2) | | CF100 | CF100 | CF100 |
| Adhesiveness (coated plate 3) | | CF100 | CF100 | CF100 |

TABLE 5

|  |  | Comparative Example 22 | Comparative Example 23 | Comparative Example 24 | Comparative Example 25 |
|---|---|---|---|---|---|
| Preliminary composition | | 100 | 100 | 100 | 100 |
| Adhesiveness-imparting agent | Compound A | — | — | — | 3 |
| | Compound B | — | — | — | — |
| First catalyst | Compound C | 0.01 | — | 0.01 | 0.01 |
| | Dibutyltin bis(pentadione) | — | 0.01 | 0.01 | — |
| Second catalyst | Dimorpholinodiethylether | 0.5 | 0.5 | 0.5 | 0.008 |
| | N,N-dimethylamino ethylmorpholine | 0.25 | 0.25 | 0.25 | — |
| TDI isocyanurate form | | 3 | 3 | 5 | — |
| TDI isocyanurate form | | 3 | 3 | 5 | — |
| Dibutyltin dilaurate | | — | — | — | — |
| High-temperature/high-humidity adhesiveness | | CF100 | CF100 | CF100 | PS10 |
| Curing rate | | ◯ | ◯ | ◯ | X |
| Flow resistance (mm) | | 0 | 0 | 0 | 0 |
| Storage stability (%) | | 18 | 19 | 19 | 15 |
| Heat-resistant adhesiveness | | CF100 | CF100 | CF100 | CF100 |
| Breaking elongation (%) | | 330 | 330 | 260 | 300 |

TABLE 5-continued

| | | | | |
|---|---|---|---|---|
| Adhesiveness (coated plate 1) | CF100 | CF100 | CF100 | CF100 |
| Adhesiveness (coated plate 2) | AF5 | AF10 | CF100 | CF100 |
| Adhesiveness (coated plate 3) | AF30 | AF30 | AF10 | CF100 |

| | | Comparative Example 26 | Comparative Example 27 | Comparative Example 28 | Comparative Example 29 |
|---|---|---|---|---|---|
| Preliminary composition | | 100 | 100 | 100 | 100 |
| Adhesiveness-imparting agent | Compound A | 3 | 3 | 3 | 3 |
| | Compound B | — | — | — | — |
| First catalyst | Compound C | 0.01 | 0.01 | 0.01 | 0.01 |
| | Dibutyltin bis(pentadione) | — | — | — | — |
| Second catalyst | Dimorpholinodiethylether | — | 2.2 | — | 1.2 |
| | N,N-dimethylamino ethylmorpholine | 0.008 | — | 2.2 | 1 |
| | TDI isocyanurate form | — | — | — | — |
| | Dibutyltin dilaurate | — | — | — | — |
| High-temperature/high-humidity adhesiveness | | CF100 | PS50 | CF100 | PS5 |
| Curing rate | | X | X | Δ | Δ |
| Flow resistance (mm) | | 0 | 0.5 | 3 | 1 |
| Storage stability (%) | | 12 | 22 | 20 | 20 |
| Heat-resistant adhesiveness | | CF100 | CF100 | CF100 | CF100 |
| Breaking elongation (%) | | 300 | 310 | 300 | 300 |
| Adhesiveness (coated plate 1) | | CF100 | CF100 | CF100 | CF100 |
| Adhesiveness (coated plate 2) | | CF100 | CF100 | CF100 | CF100 |
| Adhesiveness (coated plate 3) | | CF100 | CF100 | CF100 | CF100 |

| | | Comparative Example 30 | Comparative Example 31 | Comparative Example 32 |
|---|---|---|---|---|
| Preliminary composition | | 100 | 100 | 100 |
| Adhesiveness-imparting agent | Compound A | 3 | 3 | 3 |
| | Compound B | — | — | — |
| First catalyst | Compound C | 0.01 | 0.01 | 0.01 |
| | Dibutyltin bis(pentadione) | — | — | — |
| Second catalyst | Dimorpholinodiethylether | 1 | 0.5 | 0.05 |
| | N,N-dimethylamino ethylmorpholine | 1.2 | 1 | 0.03 |
| | TDI isocyanurate form | — | — | — |
| | Dibutyltin dilaurate | — | — | — |
| High-temperature/high-humidity adhesiveness | | CF100 | CF100 | CF100 |
| Curing rate | | Δ | ○ | X |
| Flow resistance (mm) | | 3 | 3 | 0 |
| Storage stability (%) | | 22 | 17 | 12 |
| Heat-resistant adhesiveness | | CF100 | CF100 | CF100 |
| Breaking elongation (%) | | 290 | 320 | 330 |
| Adhesiveness (coated plate 1) | | CF100 | CF100 | CF100 |
| Adhesiveness (coated plate 2) | | CF100 | CF100 | CF100 |
| Adhesiveness (coated plate 3) | | CF100 | CF100 | CF100 |

Each component shown in Tables 1 to 5 is as follows.
Preliminary composition: composition prepared and obtained as described above
Compound (A): adhesiveness-imparting agent, compound synthesized and obtained as described above
Compound (B): adhesiveness-imparting agent, HDI biuret form, trade name "Takenate D-165N", produced by Mitsui Chemicals, Inc.
Compound (C): first catalyst, compound synthesized and obtained as described above
Dibutyltin bis(pentadione): first catalyst, trade name "Neostan U-810", produced by Nitto Kasei Kogyo K.K.
Dimorpholinodiethylether: second catalyst, trade name "DMDEE", produced by San-Apro Ltd.
N,N-dimethylamino ethylmorpholine: second catalyst, trade name "X-DM", produced by Air Products and Chemicals, Inc
TDI isocyanurate form: trade name "Desmodur IL-1351", produced by Bayer, Inc.
Dibutyltin dilaurate: trade name "Neostan U-100", produced by Nitto Kasei Kogyo K.K.

As is clear from the results shown in Tables 1 to 5, the cured products of each composition of Working Examples 1 to 20 demonstrated cohesive failure (CF) for all of high-temperature/high-humidity adhesiveness, heat-resistant adhesiveness, and adhesiveness (coated plates 1 to 3) and were confirmed to have high adhesiveness. In addition, it was confirmed that the curing rate, flow resistance, storage stability, and breaking elongation were all favorable.

On the other hand, the cured products of each composition of Comparative Examples 1 to 15 and 22 to 24 demonstrated interfacial failure (AF or PS) for heat-resistant adhesiveness or adhesiveness (coated plates 1 to 3) and were confirmed to have poor adhesiveness. The cured product of each composition of Comparative Example 14 was confirmed to have poor storage stability. The cured product of each composition of Comparative Examples 16 to 21 was confirmed to have poor breaking elongation. The cured products of each composition of Comparative Examples 25 to 32 were confirmed to have poor high-temperature/high-humidity adhesiveness, curing rate, or flow resistance. Accordingly, the cured products of each composition of Comparative Examples 1 to 32 were confirmed to have poor high-temperature/high-humidity adhesiveness, curing rate, flow resistance, storage stability, heat-resistant adhesiveness, breaking elongation, or adhesiveness (coated plates 1 to 3).

It was thus ascertained that a composition in which the respective contents of a preliminary composition containing a urethane prepolymer having isocyanate groups at the terminals and carbon black, a prescribed adhesiveness-imparting agent, a prescribed first catalyst, and a prescribed second catalyst are set so as to have specific relationships demonstrates excellent adhesiveness, which makes it possible to adhere a glass adherend to a poorly adhesive adherend without performing surface treatment, and also satisfies characteristics such as high-temperature/high-humidity adhesiveness, curing rate, flow resistance, storage stability, heat-resistant adhesiveness, and breaking elongation.

What is claimed is:

1. A one-pack moisture-curing composition comprising:
   a preliminary composition comprising a urethane prepolymer having isocyanate groups at terminals and carbon black, the urethane prepolymer being obtained by reacting a polyisocyanete including 4,4 diphenylmethane diisocyanate with a polyol including polypropylene ether triol and a polypropylene ether diol, so that isocyanate groups are in excess relative to hydroxy groups;
   an adhesiveness-imparting agent containing at least one or both selected from the group consisting of a compound (A) obtained by reacting hexamethylene diisocyanate and trimethylolpropane or glycerin so that an equivalent ratio of isocyanate groups to hydroxyl groups is from 1.8 to 2.2 and a compound (B), which is a biuret form or isocyanurate form of diisocyanate;
   a first catalyst containing at least one or both selected from the group consisting of a compound (C) obtained by reacting 1,3-diacetoxy-1,1,3,3-tetrabutyldistannoxane and ethyl silicate at a molar ratio within a range of from 1:0.8 to 1:1.2 and dibutyltin bis(pentadione); and
   a second catalyst containing dimorpholinodiethylether;
   wherein:
   a content of the compound (A) is A parts by mass, a content of the compound (B) is B parts by mass, a content of the compound (C) is C parts by mass, a content of dibutyltin bis(pentadione) is D parts by mass, and a content of dimorpholinodiethylether is E parts by mass, and
   the following Formulas (1) to (3) are satisfied with respect to 100 parts by mass of the preliminary composition:

$0.1 \leq (A+B) \leq 5$ (1);

$0.001 \leq (C+D) \leq 0.5$ (2); and $0.01 \leq E \leq 2$ (3);

wherein the second catalyst further contains N,N-dimethylaminoethylmorpholine;
   a content of N,N-dimethylamino ethylmorphoine is F parts by mass; and the following Formula (4) to (6) is satisfied with respect to 100 parts by mass of the preliminary composition:

$F \leq 2$ (4);

$F \leq E$ (5); and $0.3 \leq (E+F) \leq 2$ (6).

2. The one-pack moisture-curing composition according to claim 1, wherein the preliminary composition consists essentially of the urethane prepolymer and the carbon black.

3. The one-pack moisture-curing composition according to claim 1, wherein the adhesiveness-imparting agent and the first and second catalysts are not a part of the preliminary composition.

4. The one-pack moisture-curing composition according to claim 1, wherein A>0.

5. The one-pack moisture-curing composition according to claim 1, wherein B=0.

6. The one-pack moisture-curing composition according to claim 1, wherein A>0 and B>0.

7. The one-pack moisture-curing composition according to claim 1, wherein C>0.

8. The one-pack moisture-curing composition according to claim 1, wherein D=0.

9. The one-pack moisture-curing composition according to claim 1, wherein C>0 and D>0.

10. The one-pack moisture-curing composition according to claim 1, wherein a equivalent ratio of the polyol to polyisocyanate used to produce the urethane prepolymer is such that the equivalent ratio (NCO groups/OH groups) of isocyanate groups in the polyisocyanate to the hydroxy groups in the polyol is from 1.2 to 2.2.

11. The one-pack moisture-curing composition according to claim 1, wherein a number average molecular weight of the urethane prepolymer is at least 2,000.

12. The one-pack moisture-curing composition according to claim 1, wherein the polyisocyanete is 4,4 diphenylmethane diisocyanate.

13. The one-pack moisture-curing composition according to claim 1, wherein the polyol is polypropylene ether triol and a polypropylene ether diol.

14. The one-pack moisture-curing composition according to claim 1, wherein $F \leq 2E$.

15. The one-pack moisture-curing composition according to claim 1, wherein when the adhesiveness-imparting agent contains both of the compound (A) and the compound (B), a relationship of the content of the compound (A) as A parts by mass and the content of the compound (B) as B parts by mass is represented by A=B.

16. The one-pack moisture-curing composition according to claim 1, wherein C>0, C≤0.01A and C≤0.01B.

* * * * *